United States Patent
Cambridge

(10) Patent No.: US 8,053,011 B1
(45) Date of Patent: Nov. 8, 2011

(54) DEVICE AND METHOD OF MAKING A CAKE

(76) Inventor: Sabena H. Cambridge, Jacksonville, FL (US)

( * ) Notice: Subject to any disclaimer, the term of this patent is extended or adjusted under 35 U.S.C. 154(b) by 938 days.

(21) Appl. No.: 11/731,833

(22) Filed: Apr. 2, 2007

(51) Int. Cl.
B22C 9/24 (2006.01)

(52) U.S. Cl. ........ 426/283; 426/284; 426/280; 426/391; 426/523; 220/573.1; 220/625; 220/630; 99/432; 99/449; 99/442; 164/409; 164/224; 164/402

(58) Field of Classification Search ................. 426/283, 426/284, 280, 391, 523; 220/573.1, 625, 220/639; 99/432, 449, 442; 164/409, 224, 164/402
See application file for complete search history.

(56) References Cited

U.S. PATENT DOCUMENTS

| | | | | |
|---|---|---|---|---|
| 1,009,227 A | * | 11/1911 | Rozir | 220/759 |
| 1,379,965 A | * | 5/1921 | Cleland et al. | 249/118 |
| 1,727,257 A | * | 9/1929 | Stratton et al. | 249/147 |
| 2,023,521 A | * | 12/1935 | Furnas | 294/33 |
| 2,281,015 A | * | 4/1942 | Weise | 294/33 |
| 2,612,123 A | * | 9/1952 | Nord | 30/316 |
| 3,128,724 A | | 4/1964 | Lindor | |
| 3,552,303 A | | 1/1971 | Parrish | |
| 4,440,210 A | * | 4/1984 | Lohman | 164/409 |
| 4,644,858 A | | 2/1987 | Liotto et al. | |
| D330,832 S | | 11/1992 | Goodman | |
| 5,453,287 A | | 9/1995 | Close | |
| 5,537,917 A | * | 7/1996 | Schiffer et al. | 99/442 |
| 5,538,217 A | * | 7/1996 | Chauhan | 249/57 |
| 6,176,465 B1 | | 1/2001 | Cooper et al. | |
| D542,590 S | * | 5/2007 | Levy et al. | D7/354 |

OTHER PUBLICATIONS

Sanchez, Maria Bruscino. Sweet Maria's Cake Kitchen, 1998, St. Martin Press, p. 34.*

* cited by examiner

*Primary Examiner* — Jennifer C McNeil
*Assistant Examiner* — Hong Mehta

(57) ABSTRACT

A device and method of making a cake includes a base wall and a cake form that has a size and shape for receiving the base wall. The cake form includes an outer wall having a shape corresponding to an outer perimeter of the base wall. A bottom edge of the outer wall has a peripheral flange attached thereto. The base wall is positioned into the cake form. Each of a plurality of ring portions is attached to the cake form. A lifting member includes a hand grip and a plurality of tines each having a first end attached to the hand grip and a second end comprising a hook. Each of the ring portions is simultaneously engaged by one of the hooks and the cake form lifted with the hand grip to lift the cake form from a cake after it has been formed in the cake form.

10 Claims, 3 Drawing Sheets

DEVICE AND METHOD OF MAKING A CAKE

BACKGROUND OF THE INVENTION

1. Field of the Invention

The present invention relates to cake making methods and more particularly pertains to a new cake making method for forming a cake into a desired shape and with reduced risk of cake splitting or crumbling.

2. Description of the Prior Art

The use of cake making methods is known in the prior art. While these devices fulfill their respective, particular objectives and requirements, the need remains for a device and method that allows a person to make a cake in the shape of a ribbon. Such shapes are often used to bring awareness to particular causes such as cancer awareness or to support troops in battle. Such shapes are generally hard to make without risk of the cake breaking or crumbling since the molds include edges that catch on the cake. For that reason a device is needed that allows a person to lift a cake form off of a cake so that the cake form is evenly lifted. Further, the device should include means for stabilizing the top of the cake during this procedure.

SUMMARY OF THE INVENTION

The present invention meets the needs presented above by generally providing a base wall has a top side and a bottom side. The base wall has a shape of a ribbon and includes a loop portion and two leg portions extending away from the loop portion. A cake form has a size and shape for receiving the base wall and defines an interior space for receiving cake batter. A plurality of ring portions is attached to the cake form. A lifting member is provided and includes a hand grip and a plurality of tines each having a first end and a second end. Each of the first ends is attached to the hand grip and the second ends each comprise a hook. The second ends are positioned to allow each of the ring portions to be simultaneously engaged by one of the second ends and the cake form lifted with the hand grip. The base wall is positioned into the cake form so that the base wall defines a bottom wall of the cake form. Cake batter is poured into the cake form and baking the cake batter until a cake is formed. The cake form is turned over and the ring portions engaged with the lifting member. The cake form is lifted away from the cake and the base wall and the base wall is lifted off of the cake.

The present invention further meets the needs presented above by generally comprising a base wall and a cake form that has a size and shape for receiving the base wall. The cake form defines an interior space for receiving cake batter and includes an outer wall having a shape corresponding to an outer perimeter of the base wall. A bottom edge of the outer wall has a peripheral flange attached thereto that extends inward toward the interior space. The base wall is positioned into the cake form to define a bottom wall of the cake form. Each of a plurality of ring portions is attached to the cake form. The ring portions are spaced from each other. A lifting member includes a hand grip and a plurality of tines each having a first end and a second end. Each of the first ends is attached to the hand grip and each of the second ends comprises a hook. The second ends are positioned to allow each of the ring portions to be simultaneously engaged by one of the second ends and the cake form lifted with the hand grip. The cake form is turned over and the cake form lifted away from the base wall with the lifting member after a cake has been baked in the cake form and on top of the base wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
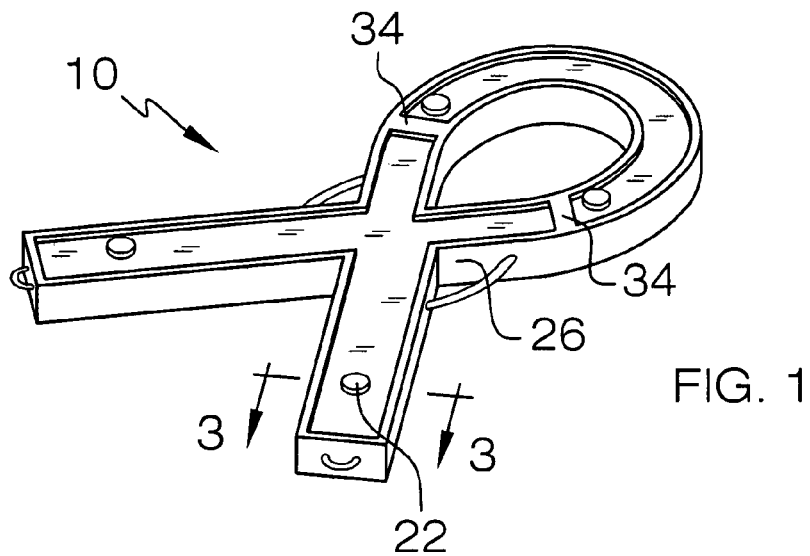
FIG. 1 is a perspective bottom view of a device and method of making a cake according to the present invention.
Figure 2:
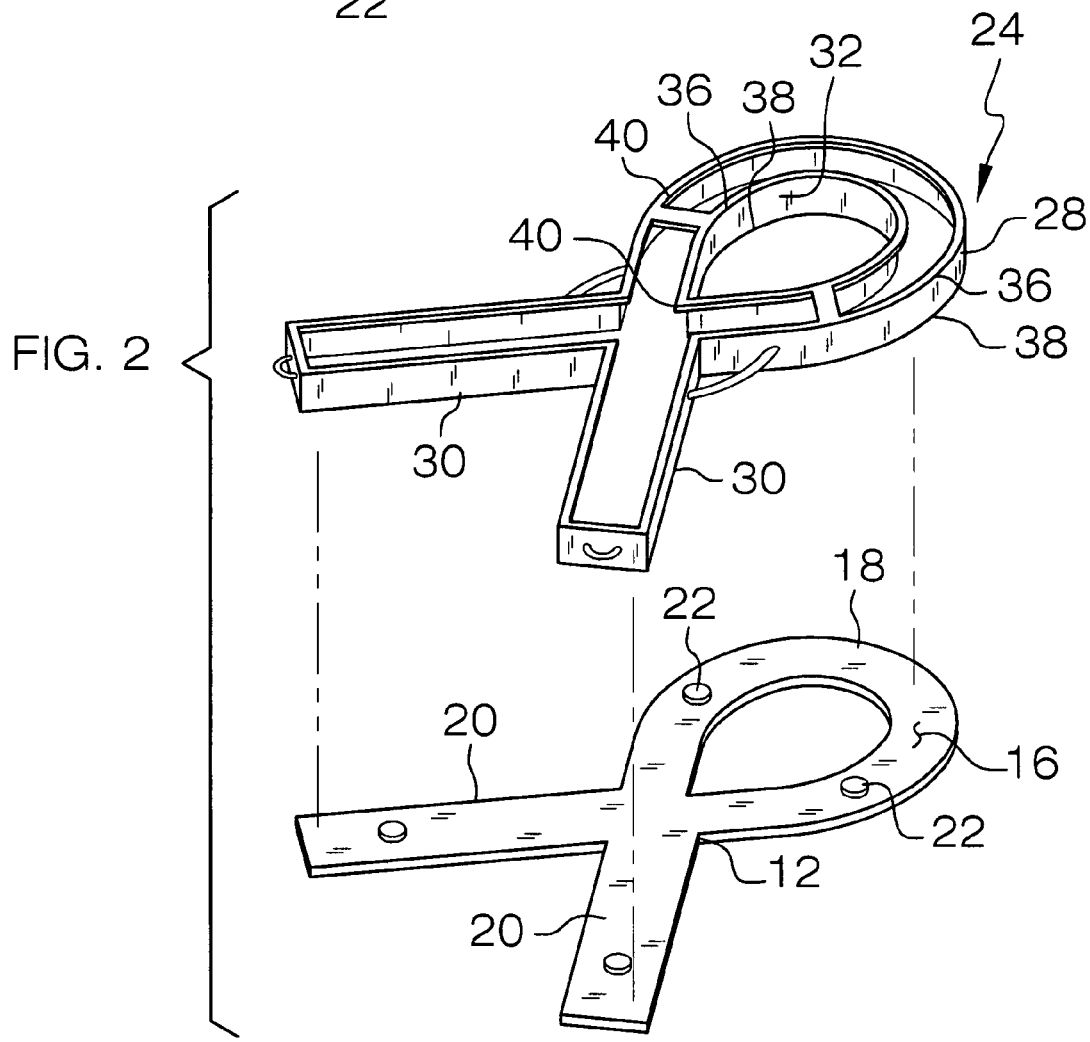
FIG. 2 is a perspective bottom view of the present invention.
Figure 3:
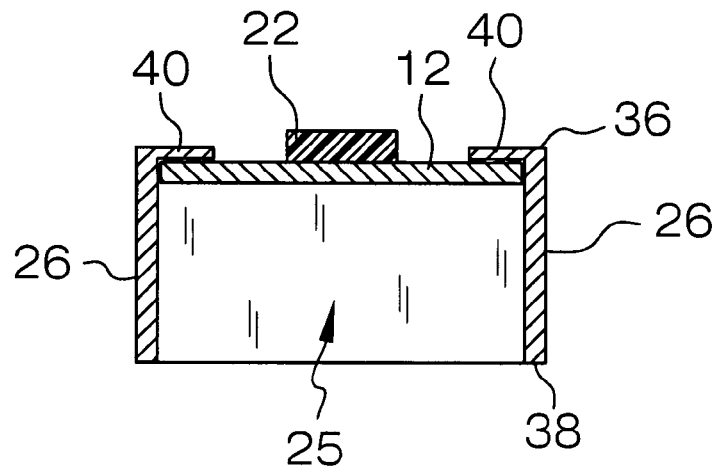
FIG. 3 is a cross-sectional view taken along line 3-3 of FIG. 1 of the present invention.
Figure 4:
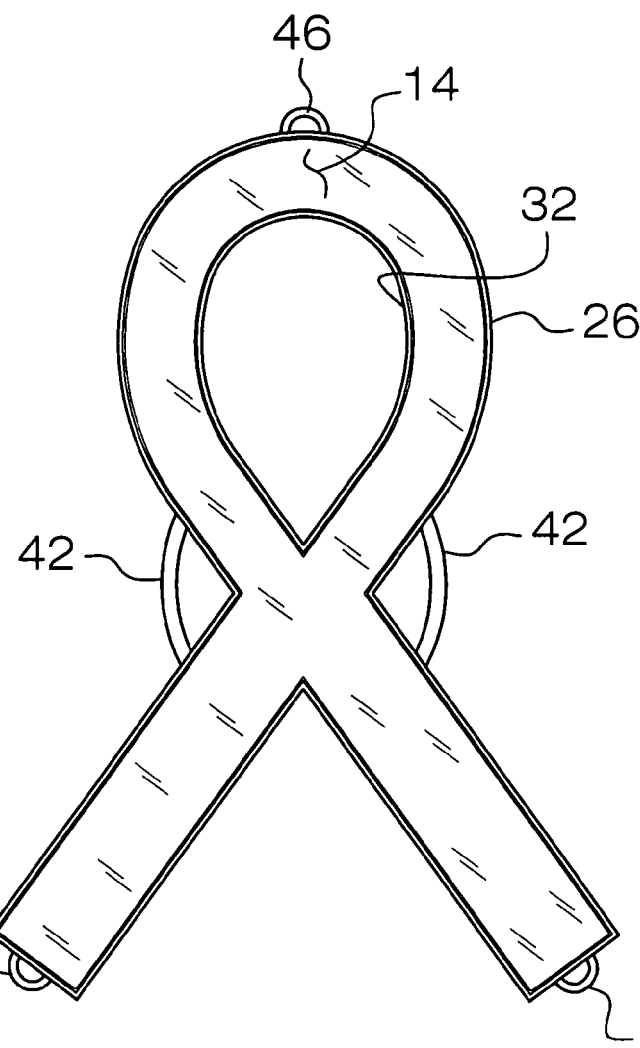
FIG. 4 is a top view of the present invention.
Figure 5:
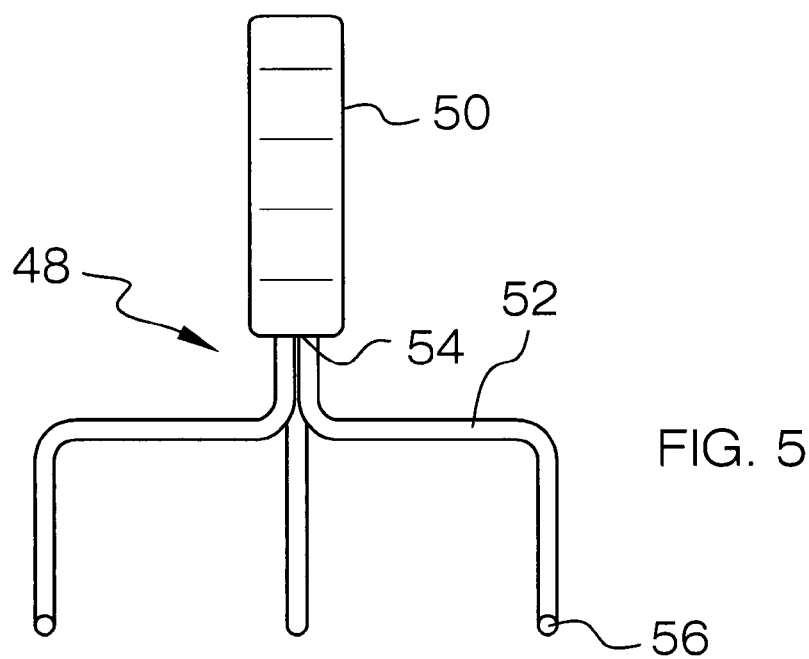
FIG. 5 is a side view of a lifting member of the present invention.
Figure 6:
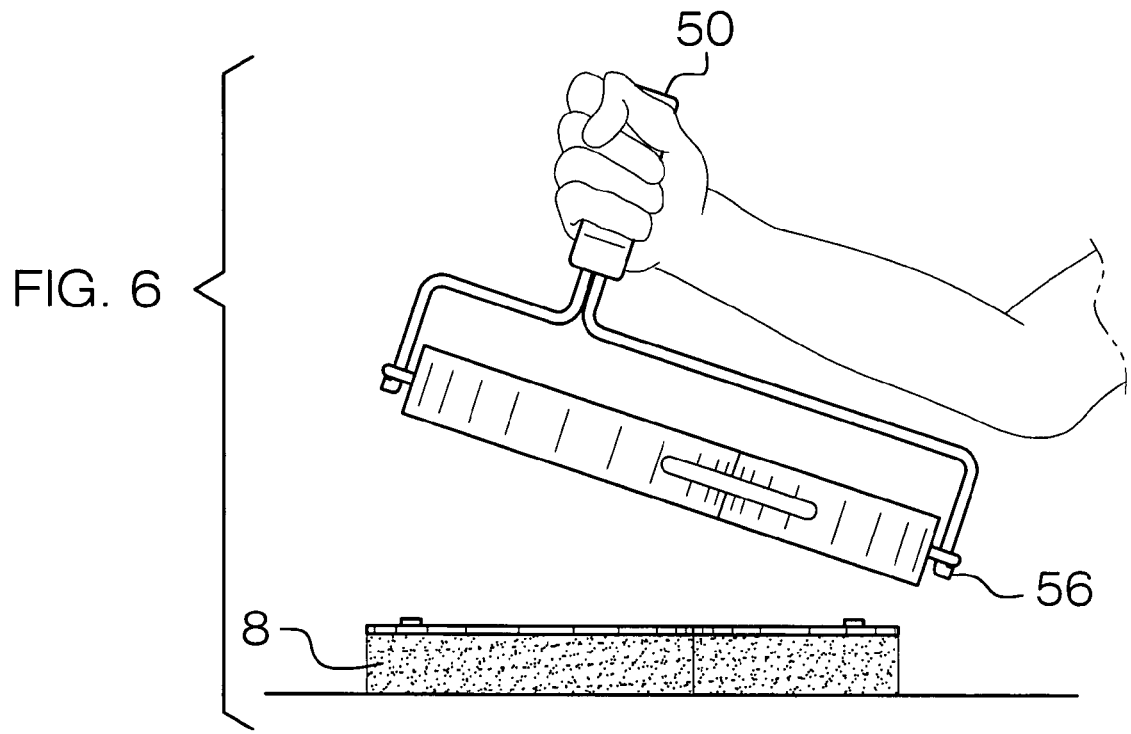
FIG. 6 is an in-use view of the present invention.

With reference now to the drawings, and in particular to FIGS. 1 through 6 thereof, a new cake making method embodying the principles and concepts of the present invention and generally designated by the reference numeral 10 will be described.

As best illustrated in FIGS. 1 through 6, the device 10 and method of making a cake 8 generally comprises providing a base wall 12 that has a top side 14 and a bottom side 16. The base wall 12 has a shape of a ribbon and includes a loop portion 18 and two leg portions 20 extending away from the loop portion 18. A plurality of grips 22 is attached to and extends downwardly away from the bottom side 16.

A cake form 24 is provided that has a size and shape for receiving the base wall 12. The cake form 24 defines an interior space 25 for receiving cake batter. The cake form 24 includes an outer wall 26 having a shape corresponding to an outer perimeter of the loop portion 18 and the leg portions 20 of the base wall 12. The outer wall 26 includes a loop section 28 and two leg sections 30. The cake form 24 includes an inner wall 32 having a shape corresponding to an inner perimeter of the loop portion 18. Supports 34 releasably secure a bottom edge 36 of the outer wall 26 to a bottom edge 36 of the inner wall 32. Each of the bottom edges 36 of the inner 32 and outer 26 walls has a peripheral flange 40 attached thereto. The peripheral flanges 40 extend inward toward the interior space 25.

A pair of handles 42 is provided. Each of the handles 42 is attached to the cake form 24 and comprises an elongated cylindrical member extending between one of the leg sections 30 and the loop section 28. The handles 42 are positioned between the bottom edge 36 and a top edge 38 of the outer wall 26.

A plurality of ring portions 44, 46 is attached to the cake form 24. The ring portions 44, 46 are spaced from each other.

The plurality of ring portions 44, 46 includes a pair of leg rings 44. Each of the leg rings 44 is attached to a distal end of one of the leg sections 30 with respect to the loop section 28. The plurality of ring portions 44, 46 includes a loop ring 46 attached to the loop section 28 and located distal to the leg sections 30.

A lifting member 48 is also provided. The lifting member 48 includes a hand grip 50 and a plurality of tines 52 each having a first end 54 and a second end 56. Each of the first ends 54 is attached to the hand grip 50 and each of the second ends 56 comprises a hook. The second ends 52 are positioned to allow each of the ring portions 44, 46 to be simultaneously engaged by one of the second ends 56 and the cake form 24 lifted with the hand grip 50.

In use, the base wall 12 is positioned into the cake form 24 so that the base wall 12 defines a bottom wall of the cake form 24. Cake batter is poured into the cake form 24 and then baked in a conventional manner until a cake 8 is formed. The cake form 24 is then turned over and the ring portions 44, 46 engaged with the lifting member 48. The cake form 24 is lifted away from the cake 8 and the base wall 12. The base wall 12 is then lifted off of the cake with the grips 22. The ring portions 44, 46 ensure that the cake form 24 will be uniformly lifted and the cake 8 will not crumble or break as the cake form 24 is being lifted away from the cake 8. The cake form 24 and base wall 12 may be coated with a non-stick surface to further prevent the cake 8 from remaining attached to the cake form 24 or to the base wall 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of making a ribbon shaped cake comprising, said method including the steps of:
   providing a base wall having a top side and a bottom side, said base wall having a shape of a ribbon including a loop portion and two leg portions extending away from said loop portion;
   providing a cake form having a size and shape for receiving said base wall, said cake form defining an interior space for receiving cake batter;
   providing a plurality of ring portions, each of said ring portions being attached to said cake form;
   providing a lifting member, said lifting member including a hand grip and a plurality of tines each extending downwardly from said hand grip, each of said tines having a first end and a second end, each of said first ends being attached to said hand grip, each of said second ends comprising a hook, said second ends being positioned to allow each of said ring portions to be simultaneously engaged by one of said second ends and said cake form lifted with said hand grip, said plurality of tines being three tines;
   positioning said base wall into said cake form so that said base wall defines a bottom wall of said cake form;
   pouring cake batter into said cake form and baking said cake batter until a cake is formed;
   turning said cake form over;
   extending said tines downwardly through and engaging said ring portions with said lifting member;
   lifting said cake form away from said cake and said base wall; and
   lifting said base wall off of said cake.

2. The method according to claim 1, further including the step of providing a plurality of grips being attached to and extending downwardly away from said bottom side, said grips being gripped to lift said base wall off of said cake.

3. The method according to claim 1, wherein the step of providing a cake form includes the step of said cake form including an outer wall having a shape corresponding to an outer perimeter of said loop portion and said leg portions of said base wall, wherein said outer wall includes a loop section and two leg sections, said cake form including an inner wall having a shape corresponding to an inner perimeter of said loop portion, supports releasably securing a bottom edge of said outer wall to a bottom edge of said inner wall, each of said bottom edges of said inner and outer walls having a peripheral flange attached thereto, said peripheral flanges extending inward toward said interior space.

4. The method according to claim 3, wherein the step of providing a plurality of ring portions include said plurality of ring portions including a pair of leg rings, each of said leg rings being attached to a distal end of one of said leg sections with respect to said loop section, said plurality of ring portions including a loop ring attached to said loop section and located distal to said leg sections.

5. The method according to claim 1, further including the step of providing a pair of handles, each of said handles being attached to said cake form.

6. The method according to claim 5, wherein the step of providing a pair of handles further includes each of said handles comprising an elongated cylindrical member extending between one of said leg sections and said loop section, each of said handles being positioned between said bottom edge and a top edge of said outer wall.

7. A method of making a ribbon shaped cake comprising, said method including the steps of:
   providing a base wall having a top side and a bottom side, said base wall having a shape of a ribbon including a loop portion and two leg portions extending away from said loop portion;
   providing a plurality of grips being attached to and extending downwardly away from said bottom side;
   providing a cake form having a size and shape for receiving said base wall, said cake form defining an interior space for receiving cake batter, said cake form including an outer wall having a shape corresponding to an outer perimeter of said loop portion and said leg portions of said base wall, wherein said outer wall includes a loop section and two leg sections, said cake form including an inner wall having a shape corresponding to an inner perimeter of said loop portion, supports releasably securing a bottom edge of said outer wall to a bottom edge of said inner wall, each of said bottom edges of said inner and outer walls having a peripheral flange attached thereto, said peripheral flanges extending inward toward said interior space;
   providing a pair of handles, each of said handles being attached to said cake form, each of said handles comprising an elongated cylindrical member extending between one of said leg sections and said loop section, each of said handles being positioned between said bottom edge and a top edge of said outer wall;

providing a plurality of ring portions, each of said ring portions being attached to said cake form, said plurality of ring portions being spaced from each other, said plurality of ring portions including a pair of leg rings, each of said leg rings being attached to a distal end of one of said leg sections with respect to said loop section, said plurality of ring portions including a loop ring attached to said loop section and located distal to said leg sections;

providing a lifting member, said lifting member including a hand grip and a plurality of tines extending downwardly from said hand grip, each of said tines having a first end and a second end, each of said first ends being attached to said hand grip, each of said second ends comprising a hook, said second ends being positioned to allow each of said ring portions to be simultaneously engaged by one of said second ends and said cake form lifted with said hand grip, said plurality of tines being three tines;

positioning said base wall into said cake form so that said base wall defines a bottom wall of said cake form;

pouring cake batter into said cake form and baking said cake batter until a cake is formed;

turning said cake form over;

extending said tines downwardly through and engaging said ring portions with said lifting member;

lifting said cake form away from said cake and said base wall; and lifting said base wall off of said cake with said grips.

8. A cake making apparatus comprising
a base wall having a top side and a bottom side;
a cake form having a size and shape for receiving said base wall, said cake form defining an interior space for receiving cake batter, said cake form including an outer wall having a shape corresponding to an outer perimeter of said base wall, a bottom edge of said outer wall having a peripheral flange attached thereto, said peripheral flange extending inward toward said interior space, wherein said base wall is positioned into said cake form to define a bottom wall of said cake form;
a plurality of ring portions, each of said ring portions being attached to said cake form and spaced from each other;
a lifting member, said lifting member including a hand grip and a plurality of tines extending downwardly from said hand grip, each of said tines having a first end and a second end, each of said first ends being attached to said hand grip, each of said second ends comprising a hook, said second ends being positioned to allow each of said ring portions to be simultaneously engaged by one of said second ends and said cake form lifted with said hand grip, said plurality of tines being three tines; and
wherein said cake form is turned over and said cake form lifted away from said base wall with said lifting member after a cake has been baked in said cake form and on top of said base wall.

9. The apparatus according to claim 8, further including a plurality of grips being attached to and extending downwardly away from said bottom side, said grips facilitating the removal of said base wall when said cake form is removed from the cake.

10. The apparatus according to claim 8, further including a pair of handles, each of said handles being attached to said cake form.

* * * * *